US008010061B2

(12) United States Patent
Erkocevic et al.

(10) Patent No.: US 8,010,061 B2
(45) Date of Patent: Aug. 30, 2011

(54) COMBINING MULTIMEDIA SIGNALING AND WIRELESS NETWORK SIGNALING ON A COMMON COMMUNICATION MEDIUM

(75) Inventors: Nedim Erkocevic, Delfgauw (NL); Franklin Sean David Schultz, Raleigh, NC (US); Kenneth David Schultz, Fuquay, NC (US)

(73) Assignee: Agere Systems, Inc., Allentown, PA (US)

( * ) Notice: Subject to any disclaimer, the term of this patent is extended or adjusted under 35 U.S.C. 154(b) by 2714 days.

(21) Appl. No.: 10/329,119

(22) Filed: Dec. 24, 2002

(65) Prior Publication Data

US 2004/0123322 A1   Jun. 24, 2004

(51) Int. Cl.
*H04B 1/02* (2006.01)
(52) U.S. Cl. ............... 455/101; 725/81; 725/127; 455/7
(58) Field of Classification Search ................ None
See application file for complete search history.

(56) References Cited

U.S. PATENT DOCUMENTS

| | | | | | |
|---|---|---|---|---|---|
| 5,404,161 | A | * | 4/1995 | Douglass et al. | 725/15 |
| 5,760,822 | A | * | 6/1998 | Coutinho | 348/121 |
| 5,883,677 | A | * | 3/1999 | Hofmann | 348/584 |
| 5,959,592 | A | * | 9/1999 | Petruzzelli | 725/68 |
| 6,006,070 | A | * | 12/1999 | Wong | 455/63.1 |
| 6,560,448 | B1 | * | 5/2003 | Baldwin et al. | 455/234.1 |
| 6,614,329 | B1 | * | 9/2003 | Woods et al. | 333/204 |
| 6,751,441 | B1 | * | 6/2004 | Murray et al. | 455/7 |
| 6,857,132 | B1 | * | 2/2005 | Rakib et al. | 725/114 |
| 7,493,078 | B2 | * | 2/2009 | Perlman | 455/3.01 |
| 2002/0056114 | A1 | * | 5/2002 | Fillebrown et al. | 725/78 |
| 2002/0142801 | A1 | * | 10/2002 | Miller et al. | 455/557 |
| 2003/0038716 | A1 | * | 2/2003 | Piesinger | 340/445 |
| 2004/0213178 | A1 | * | 10/2004 | Hood, III | 370/328 |
| 2005/0034159 | A1 | * | 2/2005 | Ophir et al. | 725/78 |

FOREIGN PATENT DOCUMENTS

WO   WO 00/05895   *   2/2000
WO   WO 00/05895   *   3/2000

OTHER PUBLICATIONS

Introduction to Electronics Design by F. H. Mitchell Jr. And F. H. Mitchell Sr. Prentice-Hall, Inc 1988.*

* cited by examiner

*Primary Examiner* — William Trost, IV
*Assistant Examiner* — Oschta Montoya
(74) *Attorney, Agent, or Firm* — Ryan, Mason & Lewis, LLP

(57) ABSTRACT

Apparatus for combining at least multimedia signaling (e.g., CATV signals) and wireless network signaling for transmission over the same communication medium includes a first port for receiving a multimedia signal, a second port for receiving a wireless networking signal, and a third port being couplable to the communication medium. The apparatus is configured for generating a combined signal at the third port, the combined signal including at least a portion of the multimedia signal and at least a portion of the wireless networking signal. In this manner, wireless networking signals may be conveyed over the same communication medium as is used for multimedia signals.

23 Claims, 2 Drawing Sheets

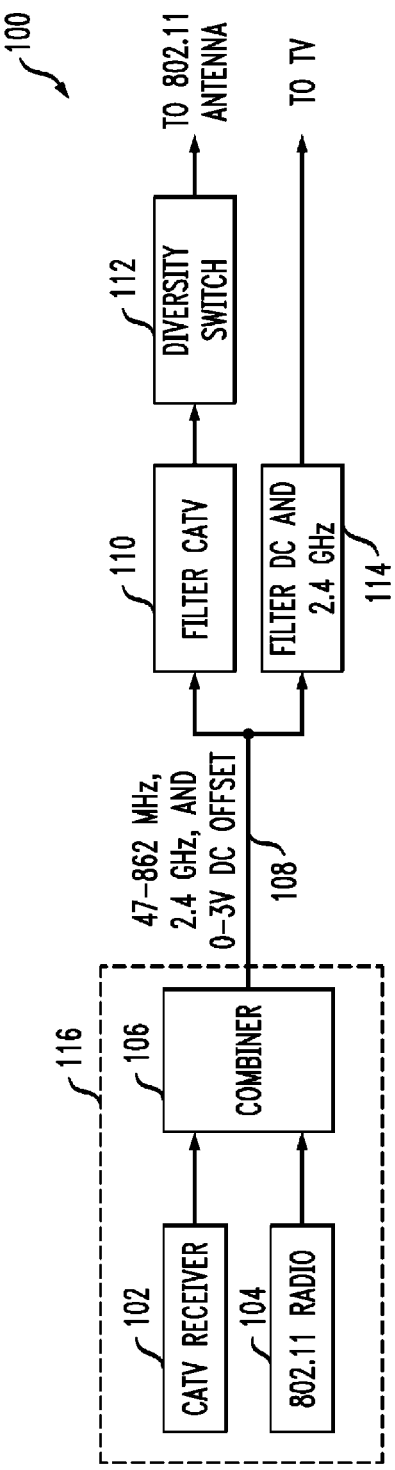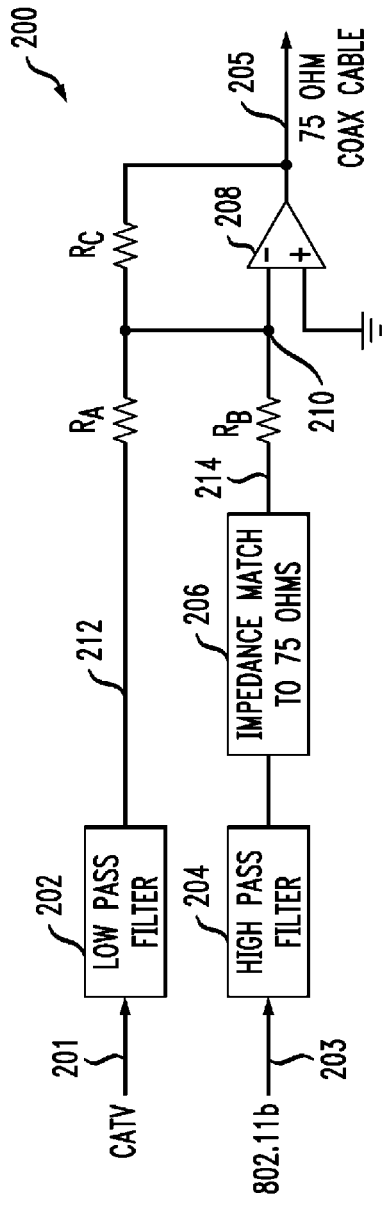

COMBINING MULTIMEDIA SIGNALING AND WIRELESS NETWORK SIGNALING ON A COMMON COMMUNICATION MEDIUM

FIELD OF THE INVENTION

The present invention relates generally to wireless communication systems, and more particularly relates to combining community antenna television (CATV) or other multimedia signaling and wireless network signaling on a cable or other communication medium.

BACKGROUND OF THE INVENTION

The full-service access network (FSAN) standard allows a service provider to supply communication services to a building, including, for example, voice, video and data services, via an optical fiber. The FSAN standard is set forth, for example, in International Telecommunication Union-Telecommunication (ITU-T) Recommendation G.983.1, entitled *Broadband Optical Access Systems Based on Passive Optical Networks* (*PON*), October 1998, and amendments made thereto, which are incorporated herein by reference. A device located external to the building generally converts the optical signals carried over the optical fiber to standard voice, data and CATV signals. Most buildings today are already equipped with coaxial cable and/or other wiring. Although it would be desirable to provide wireless local area networking services, such as wireless communication via an Institute of Electrical and Electronics Engineers (IEEE) 802.11 standard, to the building via this service, the location of the external device is typically not suitable for radio frequency (RF) transmission of 802.11 signals into the building. This may be due, for instance, to the materials constituting the walls of the building, the proximity of the point of use inside the building, which may be referred to as a station, to the exterior access point, etc.

The IEEE 802.11 standard addresses medium access control over a wireless local area network (WLAN). The IEEE 802.11 standard is set forth in the document IEEE Std. 802.11, entitled *Supplement to IEEE Standard for Information Technology-Telecommunications and Information Exchange Between Systems-Local Metropolitan Area Networks-Specific Requirements-Part 11: Wireless LAN Medium Access Control (MAC) and Physical Layer (PHY) Specifications*, 1999 Edition, which is incorporated herein by reference. Additional extensions relating to the 802.11 standard, including IEEE Std. 802.11a, entitled *High Speed Physical Layer in the 5 GHz Band*, November 1999, IEEE Std. 802.11b, entitled *Higher Speed Physical Layer (PHY) Extension in the 2.4 GHz Band*, February 2000, and IEEE Std. 802.11g, entitled *Further Higher Data Rate Extension in the 2.4 GHz Band*, September 2000, are also incorporated herein by reference. Conventionally, two separate physical cables are employed to transfer CATV signals and wireless networking signals to a television and WLAN device, respectively, inside the building. However, there is a considerable cost disadvantage to this approach, primarily due to the requirement of installing additional wiring at the building site to support the wireless networking services.

There is a need, therefore, for improved techniques for establishing wireless networking at a desired location without the need for providing additional wiring at the location.

SUMMARY OF THE INVENTION

The present invention, in an illustrative embodiment, provides techniques for utilizing existing communication media, such as coaxial cabling, at a given location as a conduit for conveying at least multimedia signals (e.g., CATV signals) and wireless networking signals (e.g., 802.11a, 802.11b and 802.11g signals, etc.), thereby eliminating the need for additional wiring to support WLAN or alternative wireless communication services at the location.

In accordance with one aspect of the invention, apparatus for combining at least multimedia signaling (e.g., CATV signals) and wireless network signaling for transmission over the same communication medium includes a first port for receiving a multimedia signal, a second port for receiving a wireless networking signal, and a third port being couplable to the communication medium. The apparatus is configured for generating a combined signal at the third port, the combined signal including at least a portion of the multimedia signal and at least a portion of the wireless networking signal. In this manner, wireless networking signals may be conveyed over the same communication medium as is used for multimedia signals.

In accordance with another aspect of the invention, the apparatus further comprises a multiplexer including a first input coupled to an output of the first port, a second input coupled to an output of the second port, and an output coupled to an input of the third port. The multiplexer is operative: (i) to receive the multimedia signal from the first port; (ii) to receive the wireless networking signal from the second port; and (iii) to generate the combined output signal at the third port.

These and other features and advantages of the present invention will become apparent from the following detailed description of illustrative embodiments thereof, which is to be read in connection with the accompanying drawings.

BRIEF DESCRIPTION OF THE DRAWINGS

FIG. 1 is a block diagram illustrating an exemplary system for combining multimedia signaling and wireless network signaling on a common communication medium, in accordance with one aspect of the invention.

FIG. 2 is a block diagram illustrating an exemplary combiner circuit for use in the system of FIG. 1, in accordance with the invention.

DETAILED DESCRIPTION OF THE PREFERRED EMBODIMENTS

Figure 3:
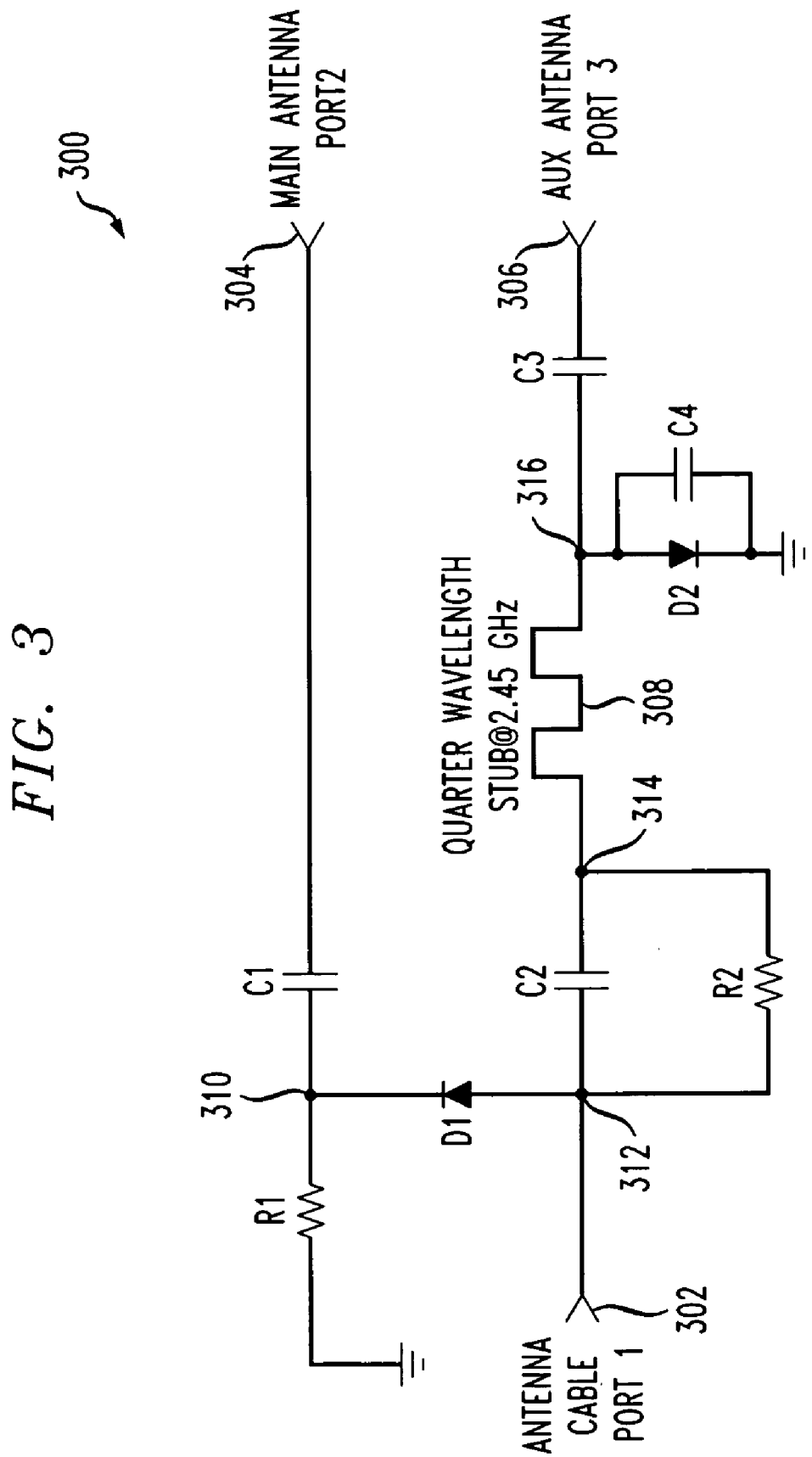
FIG. 3 is a schematic diagram illustrating an exemplary diversity switch for use in the system of FIG. 1, in accordance with the invention.

The present invention will be described herein in the context of an illustrative IEEE 802.11 compliant wireless communication system used, for example, in an FSAN environment. It should be appreciated, however, that the present invention is not limited to this or any particular wireless communication system and/or environment. Rather, the invention is more generally applicable to techniques for advantageously combining multimedia (e.g., CATV) signaling and wireless network signaling on a common communication medium (e.g., coaxial cable), thereby making use of existing wiring which may be present at a particular location to provide wireless networking services (e.g., WLAN) to the location. In this manner, the need for installing separate wiring at the location to support the additional wireless networking services can be eliminated. The techniques of the invention described herein may be applied to essentially any information transmission system under which the electrical characteristics of the existing communication medium provide a suitable capacity for transmission of the wireless networking signals. Although particularly well-suited for use in conjunction with the IEEE 802.11 standard, the invention can also be used with other standards, as well as in non-standard systems.

As previously stated, 802.11 signals, and alternative wireless networking signals, radiated outside a building, for example, near FSAN compliant customer premises equipment (CPE), will generally be ineffective at establishing a wireless communication network within the building. This is due, at least in part, to the location of the wireless equipment within the building and the potential for interference introduced, for example, by materials constituting the exterior and/or interior walls of the building. Moreover, the conventional approach of adding new wiring, such as, for example, an antenna cable, into the building to provide wireless networking services can be costly.

FIG. 1 depicts an exemplary system 100 in which the methodologies of the present invention may be implemented, in accordance with one aspect of the invention. The exemplary system 100 comprises a combiner circuit 106 which includes a first input for receiving multimedia signals from a CATV receiver 102, and at least a second input for receiving wireless networking signals from, for instance, an IEEE 802.11 compliant radio 104 (e.g., an access point). The combiner circuit 106 may reside, for example, in a CPE device 116 exterior to the building. Combiner circuit 106 preferably generates an output signal which operatively integrates the multimedia signals and the wireless networking signals for transmission over a single communication channel, which may comprise, for example, a cable 108 coupled to an output of the combiner circuit 106, as will be described in further detail below. The CATV receiver 102 and the 802.11 radio 104, both of which may reside in the CPE device 116 and are couplable to the combiner circuit 106, may comprise conventional circuitry known to those skilled in the art. Accordingly, a detailed description of these components will not be presented herein.

Cable 108 may comprise a standard 50-ohm or 75-ohm coaxial cable (e.g., RG-58U), as is typically used for residential CATV wiring. Alternatively, cable 108 may comprise wiring, such as, but not limited to, 300-ohm twin lead, twisted pair, etc. Typically, cable 108 is routed at least partially throughout the interior of the building for connecting CATV equipment, such as, but not limited to, a television (TV) receiver, video cassette recorder (VCR), etc., to the CATV receiver 102. As previously stated, the invention, in at least one aspect, takes advantage of the existing wiring that may be present at a particular location to provide wireless networking, and/or additional services, to a desired location. In accordance with one aspect of the invention, cable 108 is utilized, in essence, as an extension of the 802.11 radio 104 antenna, thereby increasing the operational range of the 802.11 radio.

Since CATV signals are generally allocated in a frequency range from about 55 megahertz (MHz) to about 890 MHz, a first filter circuit 114 may be coupled (e.g., in series) between the CATV equipment and the cable 108 to extract only those signals in the desired frequency band. The filter circuit 114 may comprise a bandpass filter that is configurable to substantially attenuate signals having frequency components below and above the desired frequency range specified for conventional CATV operation, for example, below about 50 MHz, which effectively blocks any direct current (DC) signals that may produce an undesirable DC offset in the TV receiver, and above about 900 MHz, which substantially blocks any undesirable high frequency noise components which may be present in the signal. Modifications to filter 114 may be made and are contemplated by the invention so as to configure filter 114 for use with multimedia signals in an alternative frequency range other than CATV, as will be understood by those skilled in the art.

It is to be appreciated that filter circuit 114 may instead comprise multiple filter stages coupled (e.g., in series) with one another and configurable to obtain a desired transfer characteristic. For instance, a bandpass transfer characteristic can be obtained from a combination of one or more low pass filters and one or more high pass filters coupled in series with the signal path, as will be understood by those skilled in the art. When DC blocking is not a concern, filter circuit 114 may comprise one or more low pass filters configurable to produce a transfer characteristic having a cutoff frequency above a highest anticipated CATV signal frequency component. A more detailed discussion of filter circuits may be found, for example, in the text M. E. Van Valkenburg, "Analog Filter Design," Oxford University Press, 1995, which is incorporated herein by reference.

A wireless networking antenna, such as, for example, an IEEE 802.11 antenna, located inside the building and coupled to the cable 108, is preferably used to radiate the wireless networking signals throughout the building for communication with one or more IEEE 802.11 compliant wireless devices (e.g., stations) inside the building. Wireless networking signals are preferably transmitted using carrier frequencies substantially different from that used for CATV signaling (e.g., above about 900 MHz). For example, IEEE 802.11b and IEEE 802.11g standards, which govern most present WLAN communications, typically specify a carrier frequency of about 2.4 gigahertz (GHz). Likewise, the IEEE 802.11a standard governs WLAN communications in the 5 GHz band. Wireless network communications using alternative frequency bands outside the multimedia frequency range of operation are similarly contemplated by the invention, with or without modifications to the components comprising exemplary system 100. In this manner, such wireless networking signals may be more easily discriminated from the multimedia signals existing in the combined signal transmitted over cable 108.

To accomplish this, exemplary system 100 may include a second filter circuit 110 coupled in series between the 802.11 antenna and the cable 108. Second filter circuit 110 may comprise one or more high pass filters configurable for substantially attenuating signals having frequency components below a predetermined value, for example, about 2.4 GHz, which essentially blocks any CATV or DC signals which may be present in the integrated signal generated by the combiner circuit 106. Alternative circuitry for separating the CATV signals and the wireless networking signals from the integrated signal transmitted over the cable 108 may also be employed, in accordance with the invention. It is to be appreciated that modifications to second filter 110 may be made and are contemplated by the invention so as to configure the filter 110 for use with wireless networking signals in an alternative frequency range other than 2.4 GHz (e.g., 5 GHz), as will be understood by those skilled in the art.

The exemplary system 100 may optionally include an antenna diversity switch 112 coupled in series between an output of the second filter 110 and the 802.11 antenna. The antenna diversity switch 112 can be used to eliminate nulls caused by multipath effects, and may be used where multiple antennas are employed for wireless network signaling. In 802.11 WLAN systems employing multiple antennas, such as, for example, a MAIN antenna and an AUX antenna, one of the antennas is generally used for transmission, and a digital signal processor (DSP), or alternative processing device (e.g., controller, microprocessor, central processing unit (CPU), etc.) selects which of the two antennas to use for reception, based at least in part on the signal strength of a signal received from each antenna.

At any given time, the strength of a signal received by one antenna may be superior to the strength of the signal received by another antenna, due to its orientation and/or other characteristics, and therefore is the desirable one to use. In a two antenna system, for example, antenna diversity may be accomplished by measuring the signal strength associated with one antenna, and then quickly switching to another antenna and measuring the signal strength associated with that antenna. Assuming the signal strength does change quickly with time, the antenna having the greater signal strength will be employed for reception until the next sampling period.

One difficulty with a diversity antenna system relates to how to switch between antennas when the only cable connected to them is the one carrying the signal, which in the present invention may comprise both wireless networking and CATV signals. Therefore, in accordance with another aspect of the invention, a direct current (DC) offset is preferably driven over the cable 108 on which the modulated CATV and wireless networking signals ride. Since this DC offset is essentially only used by the diversity switch 112, the offset is preferably removed, such as, for example, by filters 110, 114, before being presented to either a CATV or wireless networking device coupled to the cable.

FIG. 2 depicts an exemplary multiplexer circuit 200 in which at least a portion of the combiner circuit 106 may be implemented, in accordance with one aspect of the invention. The exemplary multiplexer circuit 200 includes a first input 201 for receiving a CATV signal and a second input 203 for receiving an IEEE 802.11 compliant signal. The exemplary multiplexer circuit 200 further includes an output 205 for conveying an output signal comprising at least a portion of the input CATV signal and at least a portion of the input 802.11 signal. This output may be coupled to the cable 108 shown in FIG. 1.

The exemplary multiplexer circuit 200 comprises an amplifier 208, such as, for example, an operational amplifier including an inverting input (−) at node 210, a non-inverting input (+), and an output coupled to the output 205 of the circuit 200. The amplifier 208, in combination with resistors $R_A$, $R_B$ and $R_C$, is coupled in a voltage adder-multiplier arrangement, so as to form a summing junction at node 210. As apparent from the figure, resistor $R_C$ is connected in a feedback arrangement, with one end of resistor $R_C$ coupled to the output 205 of the amplifier 208 and the other end of the resistor coupled to the inverting input of the amplifier at node 210. Resistor $R_A$ is coupled in series between the inverting input of amplifier 208 and the CATV input 201. Likewise, resistor $R_B$ coupled between the inverting input of amplifier 208 and the 802.11 input 203. The non-inverting input of the amplifier 208 is preferably coupled to the negative voltage supply of circuit 200, which may be ground.

Resistors $R_A$, $R_B$ and $R_C$, in addition to providing selective control of the individual gains of the CATV and 802.11 signal paths, respectively, further provide isolation between the two signal paths, and between the output 205 and a given input 201, 203 of the circuit 200. The amount of isolation will depend, at least in part, on the resistance values selected for resistors $R_A$, $R_B$ and $R_C$. In the exemplary multiplexer circuit 200, an acceptable amount of isolation may be achieved when resistors $R_A$, $R_B$ $R_C$ are chosen to have values greater than, for instance, about 1000 ohms.

As will be understood by those skilled in the art, the CATV and 802.11 signals received from inputs 201 and 203, respectively, are preferably combined at the summing junction formed at node 210 according to the following relationships:

$$V_{OUT} = -(K_1 V_{212} + K_2 V_{214}),$$

$$K_1 = \frac{R_C}{R_A},$$

$$K_2 = \frac{R_C}{R_B},$$

where $V_{OUT}$ is the voltage at the output 205 of the amplifier, $V_{212}$ and $V_{214}$ are the voltages at nodes 212 and 214, respectively, $K_1$ is the gain through the CATV signal path, and $K_2$ is the gain through the 802.11 signal path. Although the above relationships assume an amplifier having an infinite open loop gain, these relationships will also closely hold when the open loop gain is substantially high (e.g., about 10000). A more detailed analysis of summing amplifiers may be found, for example, in the previously referenced text "Analog Filter Design," by M. E. Van Valkenburg.

By way of example only, assume resistors $R_A$ and $R_C$ are each 2000 ohms and resistor $R_B$ is 1000 ohms. Using the above relationships, the gain $K_1$ through the CATV signal path will be about 1 and the gain $K_2$ through the 802.11 signal path will be about 2. The output voltage $V_{OUT}$ can then be determined as $-(V_{212} + 2V_{214})$. Thus, the output voltage will essentially comprise the input CATV signal and twice the input 802.11 signal. As will be understood by those skilled in the art, the exemplary multiplexer circuit 200 is configurable for summing virtually any desired proportions of the input CATV and 802.11 signals.

In order to sum the CATV and 802.11 signals, each of which may be carried by transmission lines typically having different impedances associated therewith, the impedance of the 802.11 transmission line is first preferably matched to an output impedance associated with the existing cable (108 in FIG. 1) coupled to output 205, which is used to convey the CATV signals (e.g., 75-ohm coaxial cable). This may be performed, for example, by an impedance matching circuit 206 coupled in series between the 802.11 input 203 and resistor $R_B$ at node 214 as shown. Alternatively, an impedance matching circuit may be placed in series between the CATV input 201 and resistor $R_A$ at node 212, in order to match the impedance of the CATV transmission line to the output impedance, assuming an impedance mismatch exists between the CATV transmission line and the cable (108 in FIG. 1). The invention further contemplates that impedance matching circuitry may be employed in both the CATV and the 802.11 signal paths for individually matching the impedances of the corresponding CATV and 802.11 transmission lines to the output transmission line impedance, in accordance with the invention.

In accordance with another aspect of the invention, impedance matching circuit 206 may comprise a simple passive inductive-capacitive (LC) network (not shown) operatively configured so that a reflection coefficient between a source (i.e., input) and load (i.e., output) of the circuit is substantially zero. Suitable LC impedance matching networks include, for example, Pi-networks, T-networks, etc., as are well known in the art. Alternative impedance matching circuitry may be similarly utilized, as will be understood by those skilled in the art. A more detailed discussion on impedance matching networks suitable for use with the present invention may be found, for example, in the text Pieter L. D. Abrie, "Design of Impedance—Matching Networks for Radio-Frequency and Microwave Amplifiers,"*Artech House Microwave Library*, August 1985, which is incorporated herein by reference.

As shown in the figure, the exemplary multiplexer circuit 200 may comprise a first filter circuit 202, which may be a low pass filter, coupled in series with the CATV signal path, such as, for example, between the CATV input 201 and resistor $R_A$ at node 212. The filter circuit 202 is preferably configured so as to substantially attenuate undesirable signals (e.g., high frequency noise, etc.) which may be present in the CATV signal. For instance, filter circuit 202 may be configured to have a cutoff frequency of about 890 MHz, preferably allowing the filter circuit 202 to pass the highest anticipated CATV signal frequency substantially unattenuated, but substantially blocking signals having frequencies beyond the typical CATV operating range.

In order to block DC signals from being propagated through the multiplexer circuit 200, a high pass filter (not shown), configured so as to substantially attenuate signals below a predetermined frequency (e.g., about 50 MHz, representing the lowest anticipated CATV signal frequency), may be coupled in series between the CATV input 201 and an input of filter 202. Alternatively, filter circuit 202 may comprise a bandpass filter, or a combination of one or more low pass and high pass filter stages, as previously described in connection with filter circuit 114 (FIG. 1).

The exemplary multiplexer circuit 200 may comprise a second filter circuit 204, which may be a high pass filter, coupled in series with the 802.11 signal path, such as, for example, between the 802.11 input 203 and an input of the impedance matching circuit 206. The filter circuit 204 is preferably configured so as to substantially attenuate undesirable signals (e.g., CATV signals, noise, etc.) which may be present in the 802.11 signal. Filter circuit 204 may be similar to filter circuit 110 previously described.

FIG. 3 illustrates an exemplary circuit 300 in which the antenna diversity switch (112 in FIG. 1) may be implemented, in accordance with one aspect of the invention. The exemplary antenna diversity switch circuit 300 includes a first port (Port 1) 302 which is couplable, directly or indirectly, to the antenna cable (108 in FIG. 1). Circuit 300 further includes a second port (Port 2) 304, which may be coupled to a MAIN antenna, and at least a third port (Port 3) 306, which may be coupled to an AUX antenna. As previously stated, an 802.11 radio (e.g., access point) may employ multiple antennas. In this instance, one of the antennas (e.g., MAIN antenna) is used for transmission, and a DSP, or alternative processing device, operatively selects which of the multiple antennas (e.g., MAIN or AUX antennas) to use for reception based, at least in part, on a comparison of signal strengths of the received signal from one or more of the antennas.

As apparent from the figure, the exemplary circuit 300 comprises RF PIN diodes D1 and D2, operatively connected to enable the transmission of signals from port 302 to port 304, while substantially blocking the transmission of signals from port 302 to port 306. Specifically, an anode of diode D1 is connected to port 302 at node 312 and a cathode of diode D1 is connected to node 310. An anode of diode D2 is connected to node 316 and a cathode of diode D2 is coupled to the negative voltage supply, which may be ground. PIN diodes are typically employed in RF applications due, at least in part, to their very low forward resistance (e.g., less than about 1 ohm at 100 MHz), thereby providing low insertion loss, and very low capacitance (e.g., less than 0.3 pF at 100 MHz), thereby providing high isolation. A bypass capacitor C4 is connected in parallel across diode D2 (i.e., between node 416 and ground). Coupling capacitors C1 and C3 are connected in series between port 304 and node 310, and between port 306 and node 316, respectively. A load resistor R1 is connected between node 310 and ground.

Coupling capacitor C2 is preferably connected in series between port 302 and a first end of a quarter wavelength stub 308 at node 314. Resistor R2 is connected in parallel across capacitor C2 (i.e., between node 312 and node 314). A second end of stub 308 is coupled to node 316. The stub 308 is preferably tuned to be one quarter wavelength at a frequency of about 2.45 GHz, the desired operating frequency of the circuit 300. A stub length of about three centimeters (cm) may be employed in exemplary circuit 300.

Table 1 below illustrates exemplary values which may be used for the components of circuit 300, in accordance with a preferred embodiment of the invention. As will be appreciated by those skilled in the art, the values BAR63 and BAR80 for diodes D1 and D2, respectively, represent preferred manufacturer part numbers (e.g., Infineon, Siemens, etc.). Although the values listed in Table 1 may be suitable for use in a 2.4 GHz frequency band, the circuit may also be employed in alternative frequency bands (e.g., in a 5 GHz frequency band), with or without modification to the circuit 300 and/or component values specified.

TABLE 1

| Reference Designation | Value |
|---|---|
| C1, C2, C3, C4 | 8 picofarad (pF) |
| R1, R2 | 1000 ohms |
| D1 | BAR63 |
| D2 | BAR80 |

As previously stated with reference to FIG. 1, the cable 108 preferably conveys the 802.11 compliant signal to an antenna within the building at a given location. This antenna then radiates the 802.11 signal to compatible stations (mobile or fixed) inside the building. In accordance with another aspect of the invention, at least a portion of the cable 108 itself may be used as a distributed antenna system to radiate the 802.11 signals, thereby eliminating the need for a separate antenna. As will be understood by those skilled in the art, RF signals propagate along a wire as a surface-guided wave at low attenuation. As the surface wave propagates along the wire, it leaks radiation. The amount of RF leakage generally increases as the frequency of the signal increases. Thus, standard CATV cabling inside a building, which is typically designed to carry signals having frequencies up to about 1 GHz, can also serve to radiate, at least somewhat, wireless networking signals (e.g., 802.11) transmitting at about 2.4 GHz or higher.

There are several commercially available products which can enhance the radiation efficiency of a cable or wire. For example, leaky coax (e.g., manufactured by AeroComm, Inc.) removes the shielding from portions of the coaxial cable inside the building in selected areas so as to provide RF coverage in unusually shaped environments that otherwise do not provide adequate coverage from a point source. Other commercially available products include, for example, Rad-Wire II, a trademark of Rubytron, which replaces radiating coaxial feeders, coaxial cable, individual antennas, etc., with a single-wire surface-wave transmission line. In either of these products, the primary objective is to utilize the cable itself as a distributed antenna system for radiating the wireless networking signals being conveyed through the cable.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims. For example, the invention can be used with standards other than IEEE 802.11 (e.g., IEEE 802.15), as well as in non-standard applications.

What is claimed is:

1. Apparatus for providing wireless network signaling over a communication medium, the apparatus comprising:
   a first port for receiving a multimedia signal;
   a second port for receiving a wireless networking signal; and
   a third port being couplable to the communication medium;
   wherein the apparatus is configured for generating a combined signal at the third port for transmission over the communication medium, the combined signal comprising at least a portion of the multimedia signal and at least a portion of the wireless networking signal;
   wherein an antenna diversity switch is coupled in series between the communication medium and a plurality of antennas associated with a wireless networking device, the diversity switch being configured such that one of the plurality of antennas is selected to transmit the wireless networking signal; and
   wherein the apparatus is configured for driving a direct current offset over the communication medium for use by the antenna diversity switch in selecting the one of the plurality of antennas to transmit the wireless networking signal.

2. The apparatus of claim 1, further comprising at least one of:
   a first filter including an input coupled to the first port and an output coupled to a multimedia device, the first filter being configurable so as to substantially attenuate signal frequency components outside of an anticipated frequency range of the multimedia signal; and
   a second filter including an input coupled to the second port and an output coupled to a wireless networking device, the second filter being configurable so as to substantially attenuate signal frequency components outside of an anticipated frequency range of the wireless networking signal.

3. The apparatus of claim 2, wherein the first and second filters are configurable for operation in substantially mutually exclusive frequency ranges.

4. The apparatus of claim 2, wherein the first filter comprises a low pass filter and wherein the second filter comprises a high pass filter.

5. The apparatus of claim 1, further comprising:
   at least one impedance matching circuit coupled in series between at least one of (i) an output of the first port and an input of the third port, and (ii) an output of the second port and the input of the third port, the at least one impedance matching circuit being configured so as to substantially match an impedance associated with at least one of a transmission line coupled to an input of the first port and a transmission line coupled to an input of the second port, respectively, with an impedance associated with a transmission line coupled to an output of the third port.

6. The apparatus of claim 1, further comprising:
   an amplifier circuit including at least one input configurable as a summing junction operatively coupled to the outputs of the first and second ports, and an output coupled to an input of the third port, the amplifier circuit being configured to at least one of (i) selectively amplify the multimedia signal by a first gain, and (ii) selectively amplify the wireless networking signal by a second gain.

7. The apparatus of claim 6, wherein the amplifier circuit comprises:
   an amplifier;
   a first resistor connected between an output of the amplifier and an input of the amplifier in a feedback arrangement, the first resistor having a first resistance value associated therewith;
   a second resistor connected in series between the input of the amplifier and the output of the first port, the second resistor having a second resistance value associated therewith; and
   a third resistor connected in series between the input of the amplifier and the output of the second port, the third resistor having a third resistance value associated therewith;
   wherein the first gain is selectively adjustable as a function of the first and second resistance values, and the second gain is selectively adjustable as a function of the first and third resistance values.

8. The apparatus of claim 1, wherein the wireless networking signal comprises an IEEE 802.11 compliant signal.

9. The apparatus of claim 1, wherein the multimedia signal comprises a community antenna television (CATV) signal.

10. The apparatus of claim 1, wherein the communication medium comprises a coaxial cable.

11. The apparatus of claim 1, further comprising:
    a multiplexer including a first input coupled to an output of the first port, a second input coupled to an output of the second port, and an output coupled to an input of the third port, the multiplexer being operative: (i) to receive the multimedia signal from the first port; (ii) to receive the wireless networking signal from the second port; and (iii) to generate the combined output signal at the third port.

12. The apparatus of claim 1, wherein a signal strength of wireless networking signals from two or more of the plurality of antennas are compared to determine which of the plurality of antennas is used to receive the wireless networking signal.

13. The apparatus of claim 1, wherein the wireless networking signal has a frequency above that of the multimedia signal.

14. A method for providing wireless network signaling over a communication medium, the method comprising the steps of:
    receiving a multimedia signal from the communication medium;
    receiving a wireless networking signal, the wireless networking signal being distinguishable at least in frequency from the multimedia signal;
    generating a combined signal, the combined signal comprising at least a portion of the multimedia signal and at least a portion of the wireless networking signal;
    transmitting the combined signal over the communication medium; and
    providing an antenna diversity switch coupled in series between the communication medium and a plurality of antennas associated with a wireless networking device, the diversity switch being configured such that one of the plurality of antennas is selected to transmit the wireless networking signal;

wherein the transmitting step comprises driving a direct current offset over the communication medium for use by the antenna diversity switch in selecting the one of the plurality of antennas to transmit the wireless networking signal.

15. The method of claim 14, further comprising the step of extracting the multimedia signal and the wireless networking signal from the combined signal for use by a multimedia device and a wireless networking device, respectively, couplable to the communication medium.

16. The method of claim 14, wherein the communication medium comprises a coaxial cable.

17. The method of claim 14, wherein the multimedia signal is a community antenna television (CATV).

18. The method of claim 14, wherein the wireless networking signal is an IEEE 802.11 compliant signal.

19. The method of claim 14, wherein the wireless networking signal has a frequency above that of the multimedia signal.

20. An integrated circuit (IC) device including at least one apparatus for providing wireless network signaling over a communication medium, the at least one apparatus comprising:
   a first port for receiving a multimedia signal;
   a second port for receiving a wireless networking signal; and
   a third port being couplable to the communication medium;
   wherein the apparatus is configured for generating a combined signal at the third port for transmission over the communication medium, the combined signal comprising at least a portion of the multimedia signal and at least a portion of the wireless networking signal;
   wherein an antenna diversity switch is coupled in series between the communication medium and a plurality of antennas associated with a wireless networking device, the diversity switch being configured such that one of the plurality of antennas is selected to transmit the wireless networking signal; and
   wherein the apparatus is configured for driving a direct current offset over the communication medium for use by the antenna diversity switch in selecting the one of the plurality of antennas to transmit the wireless networking signal.

21. The IC device of claim 20, wherein the at least one apparatus further comprises:
   a multiplexer including a first input coupled to an output of the first port, a second input coupled to an output of the second port, and an output coupled to an input of the third port, the multiplexer being operative: (i) to receive the multimedia signal from the first port; (ii) to receive the wireless networking signal from the second port; and (iii) to generate the combined output signal at the third port.

22. The IC device of claim 20, wherein a signal strength of wireless networking signals from two or more of the plurality of antennas are compared to determine which of the plurality of antennas is used to receive the wireless networking signal.

23. The IC device of claim 20, wherein the wireless networking signal has a frequency above that of the multimedia signal.

* * * * *